United States Patent
Roush (10) Patent No.: US 7,918,727 B2
(45) Date of Patent: *Apr. 5, 2011

(54) LIVE EVENT INTERACTIVE GAME AND METHOD OF DELIVERY

(75) Inventor: Dale Roush, Amarillo, TX (US)

(73) Assignee: Dale Roush, Amarillo, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/650,286

(22) Filed: Dec. 30, 2009

(65) Prior Publication Data

US 2010/0105483 A1 Apr. 29, 2010

Related U.S. Application Data

(63) Continuation of application No. 10/764,814, filed on Jan. 26, 2004, now Pat. No. 7,641,553.

(60) Provisional application No. 60/442,940, filed on Jan. 27, 2003.

(51) Int. Cl.
*A63F 1/18* (2006.01)
*G06F 19/00* (2006.01)

(52) U.S. Cl. .............. 463/22; 463/11; 463/42; 273/292; 273/293; 273/306; 283/903

(58) Field of Classification Search .............. 463/10–13, 463/16–22, 25, 29, 40–42; 273/138.1, 139, 273/142 B, 142 A, 142 J, 148 A, 148 R, 148 B, 273/149 P, 149 R, 274, 292–293, 304, 306, 273/309; 283/49, 903; 705/14.1, 14.12, 705/14.22, 14.3, 14.38

See application file for complete search history.

(56) References Cited

U.S. PATENT DOCUMENTS

| | | | |
|---|---|---|---|
| 3,495,700 A | 2/1970 | Chandos | |
| 3,534,963 A | 10/1970 | Weimer | |
| 3,603,592 A | 9/1971 | Bury | |
| 4,169,601 A | 10/1979 | Frischmann et al. | |
| 4,429,877 A | 2/1984 | Coppock | |
| 4,540,174 A | 9/1985 | Coppock | |
| 4,569,529 A | 2/1986 | Gibbs | |
| 4,764,666 A | 8/1988 | Bergeron | |
| 4,781,377 A | 11/1988 | McVean et al. | |
| 4,882,473 A | 11/1989 | Bergeron et al. | |
| 4,883,636 A | 11/1989 | Fantle, Jr. | |
| 4,918,603 A | 4/1990 | Hughes et al. | |
| 5,035,422 A | 7/1991 | Berman | |
| 5,083,271 A | 1/1992 | Thacher et al. | |
| 5,108,115 A | 4/1992 | Berman et al. | |
| 5,411,258 A | 5/1995 | Wilson et al. | |
| 5,417,431 A * | 5/1995 | Gluck ............................ | 273/293 |
| 5,518,239 A | 5/1996 | Johnston | |
| 5,533,124 A * | 7/1996 | Smith et al. ...................... | 705/57 |
| 5,647,795 A | 7/1997 | Stanton | |
| 5,683,090 A | 11/1997 | Zeile et al. | |
| 5,687,087 A * | 11/1997 | Taggart ......................... | 700/233 |
| 5,734,413 A | 3/1998 | Lappington et al. | |
| 5,746,657 A | 5/1998 | Ueno | |

(Continued)

*Primary Examiner* — David L Lewis
*Assistant Examiner* — Arthur O. Hall (57) ABSTRACT

The disclosure describes a computer-implemented method of providing an event related game. The method includes receiving event data associated with a media broadcast at a computer, generating a printable game set, and providing the printable game set in an electronic format configured for printing by a user. The printable game set includes at least one game card and a set of trade tickets. The at least one game card includes a list of game events associated with the media broadcast. Each trade ticket of the set of trade tickets identifies a game event.

6 Claims, 7 Drawing Sheets

U.S. PATENT DOCUMENTS

| | | |
|---|---|---|
| 5,748,731 A | 5/1998 | Sheperd |
| 5,845,261 A | 12/1998 | McAbian |
| 5,897,623 A | 4/1999 | Fein et al. |
| 6,024,640 A | 2/2000 | Walker et al. |
| 6,107,932 A * | 8/2000 | Walker et al. ............... 340/5.22 |
| 6,193,605 B1 | 2/2001 | Libby et al. |
| 6,200,216 B1 * | 3/2001 | Peppel ............................. 463/1 |
| 6,322,077 B1 * | 11/2001 | Braunlich et al. ............ 273/292 |
| 6,402,152 B1 * | 6/2002 | Kutzik ........................ 273/296 |
| 6,468,162 B1 * | 10/2002 | Nakamura ..................... 463/43 |
| 6,497,410 B1 * | 12/2002 | Bernstein et al. ............ 273/297 |
| 6,513,339 B1 | 2/2003 | Kopko |
| 6,527,270 B2 | 3/2003 | Maksymec et al. |
| 6,656,039 B2 * | 12/2003 | Yamada ......................... 463/11 |
| 6,688,973 B2 * | 2/2004 | Satloff et al. .................... 463/1 |
| 6,753,883 B2 | 6/2004 | Schena et al. |
| 6,909,220 B2 | 6/2005 | Chen |
| 6,993,500 B2 * | 1/2006 | Ishihara ......................... 705/27 |
| 7,195,148 B2 * | 3/2007 | Kimura et al. ................ 235/375 |
| 7,246,066 B2 | 7/2007 | Black |
| 7,314,407 B1 * | 1/2008 | Pearson ............................ 463/7 |
| 7,384,340 B2 * | 6/2008 | Eguchi et al. .................. 463/43 |
| 2001/0016509 A1 | 8/2001 | Kusuda |
| 2001/0039206 A1 * | 11/2001 | Peppel ............................ 463/31 |
| 2001/0044336 A1 * | 11/2001 | Reiss et al. ..................... 463/17 |
| 2002/0028710 A1 * | 3/2002 | Ishihara et al. ................ 463/44 |
| 2002/0037767 A1 | 3/2002 | Ebin |
| 2002/0052238 A1 * | 5/2002 | Muroi ............................ 463/40 |
| 2002/0128922 A1 * | 9/2002 | Joao ............................... 705/26 |
| 2003/0008695 A1 | 1/2003 | Libby et al. |
| 2003/0050109 A1 | 3/2003 | Caro et al. |
| 2003/0060261 A1 | 3/2003 | Katz et al. |
| 2003/0060262 A1 | 3/2003 | Yeend |
| 2003/0109310 A1 | 6/2003 | Heaton et al. |
| 2003/0236736 A1 * | 12/2003 | Harmon et al. ................ 705/37 |
| 2004/0063484 A1 * | 4/2004 | Dreaper et al. ................ 463/16 |
| 2004/0104845 A1 | 6/2004 | McCarthy |
| 2004/0152521 A1 | 8/2004 | Shinoda |
| 2006/0246983 A1 | 11/2006 | Huard et al. |

\* cited by examiner

FOOTBALLPARTYGAME.COM EVENTS

| # | Team | Event | Frequency | 1 | 2 | 3 | 4 | Max |
|---|---|---|---|---|---|---|---|---|
| 1 | Baltimore | CALL TIME OUT | EACH QUARTER | | | | | 2 |
| 2 | New York | CALL TIME OUT | EACH QUARTER | | | | | 2 |
| 3 | Baltimore | COMPLETE PASS | EACH QUARTER | | | | | 4 |
| 4 | New York | COMPLETE PASS | EACH QUARTER | | | | | 4 |
| 5 | Baltimore | CONVERT ON FOURTH DOWN | EACH QUARTER | | | | | 2 |
| 6 | New York | CONVERT ON FOURTH DOWN | EACH QUARTER | | | | | 2 |
| 7 | Baltimore | CONVERT ON FOURTH DOWN (FAILS) | EACH QUARTER | | | | | 2 |
| 8 | New York | CONVERT ON FOURTH DOWN (FAILS) | EACH QUARTER | | | | | 2 |
| 9 | Baltimore | DEFENSIVE PENALTY | EACH QUARTER | | | | | 4 |
| 10 | New York | DEFENSIVE PENALTY | EACH QUARTER | | | | | 4 |
| 11 | Baltimore | EXTRA POINT GOOD | EACH QUARTER | | | | | 2 |
| 12 | New York | EXTRA POINT GOOD | EACH QUARTER | | | | | 2 |
| 13 | Baltimore | FIRST TO SCORE | EACH QUARTER | | | | | 2 |
| 14 | New York | FIRST TO SCORE | EACH QUARTER | | | | | 2 |
| 15 | Baltimore | FUMBLE | EACH QUARTER | | | | | 2 |
| 16 | New York | FUMBLE | EACH QUARTER | | | | | 2 |
| 17 | Baltimore | INTERCEPT | EACH QUARTER | | | | | 2 |
| 18 | New York | INTERCEPT | EACH QUARTER | | | | | 2 |
| 19 | Baltimore | MAKE FIELD GOAL | EACH QUARTER | | | | | 4 |
| 20 | New York | MAKE FIELD GOAL | EACH QUARTER | | | | | 4 |
| 21 | Baltimore | MAKE FIRST DOWN | EACH QUARTER | | | | | 4 |
| 22 | New York | MAKE FIRST DOWN | EACH QUARTER | | | | | 4 |
| 23 | Baltimore | OFFENSIVE PENALTY | EACH QUARTER | | | | | 2 |
| 24 | New York | OFFENSIVE PENALTY | EACH QUARTER | | | | | 2 |
| 25 | Baltimore | SACK QUARTERBACK | EACH QUARTER | | | | | 1 |
| 26 | New York | SACK QUARTERBACK | EACH QUARTER | | | | | 1 |
| 27 | Baltimore | INJURED PLAYER LEAVES THE FIELD | EACH QUARTER | | | | | 1 |
| 28 | New York | INJURED PLAYER LEAVES THE FIELD | EACH QUARTER | | | | | 1 |
| 29 | Baltimore | DEFENSE MAKE TOUCHDOWN DEFENSE MAKE | EACH QUARTER | | | | | 0 |
| 30 | New York | TOUCHDOWN | EACH QUARTER | | | | | 0 |
| 31 | Baltimore | PUNTS | EACH QUARTER | | | | | 4 |
| 32 | New York | PUNTS | EACH QUARTER | | | | | 4 |
| 33 | Baltimore | DEFENSIVE PENALTY (DECLINED) | EACH QUARTER | | | | | 2 |
| 34 | New York | DEFENSIVE PENALTY (DECLINED) | EACH QUARTER | | | | | 2 |
| 35 | Baltimore | OFFENSIVE PENALTY (DECLNED) | EACH QUARTER | | | | | 1 |
| 36 | New York | OFFENSIVE PENALTY (DECLINED) | EACH QUARTER | | | | | 1 |
| 37 | Baltimore | GETS (SCORES) SAFETY | EACH QUARTER | | | | | 0 |
| 38 | New York | GETS (SCORES) SAFETY | EACH QUARTER | | | | | 0 |
| 39 | Baltimore | BLOCKS PUNT | EACH QUARTER | | | | | 0 |
| 40 | New York | BLOCKS PUNT | EACH QUARTER | | | | | 0 |
| 41 | Baltimore | BLOCKS FIELD GOAL | EACH QUARTER | | | | | 0 |
| 42 | New York | BLOCKS FIELD GOAL | EACH QUARTER | | | | | 0 |
| 43 | Baltimore | QUARTER BACK SCRAMBLES FOR FIRST DOWN | EACH QUARTER | | | | | 1 |
| 44 | New York | QUARTER BACK SCRAMBLES FOR FIRST DOWN | EACH QUARTER | | | | | 1 |
| 45 | Baltimore | QUARTER BACK SCORES | EACH QUARTER | | | | | 1 |
| 46 | New York | QUARTER BACK SCORES | EACH QUARTER | | | | | 1 |
| 47 | Baltimore | KICKOFF OR PUNT RETURN FOR SCORE | EACH QUARTER | | | | | 1 |
| 48 | New York | KICKOFF OR PUNT RETURN FOR SCORE | EACH QUARTER | | | | | 1 |
| 49 | | OFFICIAL TIME OUT FOR ANY REASON | EACH QUARTER | | | | | 1 |
| 50 | | OFFICIAL TIME OUT FOR ANY REASON | EACH QUARTER | | | | | 1 |

90

THIS ROW REPRESENTS PROBABILITY PER GAME MAXIMUM

| | | | |
|---|---|---|---|
| Baltimore | AHEAD | | 5 |
| New York | AHEAD | | 5 |

*FIG. 7*

Washington vs. Dallas Sep 15 2002 12:00 A..M.

FIRST QUARTER

| | |
|---|---|
| Washington Defense Makes Touchdown | |
| Dallas Offensive Penalty (Declined) | |
| Washington Get (Score) Safety | |
| Dallas Kickoff or Punt Return for Score | |
| Dallas QB Scrambles for First Down | |

SECOND QUARTER

| | |
|---|---|
| Official Time Out For Any Reason | |
| Washington Convert on Fourth Down | |
| Dallas Convert on Fourth Down (Fail) | |
| Washington Defensive Penalty | |
| Dallas First to Score | |

HALFTIME

| | |
|---|---|
| Dallas Ahead | |

THIRD QUARTER

| | |
|---|---|
| Washington Fumble | |
| Dallas Intercept | |
| Washington Make Field Goal | |
| Dallas Fumble | |
| Washington Sack Quarterback | |

FOURTH QUARTER

| | |
|---|---|
| Washington Injured Player Leaves the Field | |
| Dallas Defense Makes Touchdown | |
| Washington Punts | |
| Washington Offensive Penalty (Declined) | |
| Dallas QB Scrambles for First Down | |

Washington Trade Tickets
Wins
Makes Two Point Conversion
Fumbles
Makes Passing Touchdown
Makes Rushing Touchdown
Request Video Challenge and is Upheld
Maked Field Goal
Misses Field Goal
Intercepts Pass
Punts
Attempts Onside Kick and Recovers
Attempts Onside Kick and Dosen't Recover
Quarterback Spikes Ball to Stop Clock
Calls Time Out Dallas Trade Tickets
Wins
Makes Two Point Conversion
Fumbles
Makes Passing Touchdown
Makes Rushing Touchdown
Request Video Challenge and is Upheld
Maked Field Goal
Misses Field Goal
Intercepts Pass
Punts
Attempts Onside Kick and Recovers
Attempts Onside Kick and Dosen't Recover
Quarterback Spikes Ball to Stop Clock
Calls Time Out

*FIG. 8*

Trade Tickets

| Washington Wins | Dallas Wins |

| Washington Makes Two Point Conversion | Dallas Makes Two Point Conversion |

| Washington Fumbles | Dallas Fumbles |

| Washington Makes Passing Touchdown | Dallas Makes Passing Touchdown |

| Washington Makes Rushing Touchdown | Dallas Makes Rushing Touchdown |

LIVE EVENT INTERACTIVE GAME AND METHOD OF DELIVERY

CROSS-REFERENCE TO RELATED APPLICATION(S)

The present application is a continuation application of U.S. application Ser. No. 10/764,814, filed Jan. 26, 2004, which in turn claims priority from U.S. provisional patent application No. 60/442,940, filed Jan. 27, 2003, entitled "LIVE EVENT INTERACTIVE GAME AND METHOD OF DELIVERY," naming inventor Dale Roush, which applications are incorporated by reference herein in their entirety.

TECHNICAL FIELD

The disclosure, in general, relates to interactive games. More specifically, this disclosure relates to the distribution of games for facilitating interaction with live events.

BACKGROUND

Sports events, reality television, and other broadcast have unpredictable outcomes. However, because of rules and other factors, the outcome and other events within the broadcast are derived from a known set. For example, a football game has events within a game that are derived from a known set. Each game may or may not have a touchdown, interception, field goal, or blocked punt, among various events. In addition, the rules are often established such that one of the two teams must win, although which one is unknown at the beginning of the game. Similarly, other broadcast television programs, web broadcasts, and programming may have an associated set of possible events, although the occurrence of any one of the possible events and the outcome are unknown.

Other games have attempted to create interactivity with sports events. Often, these games require ongoing network access and expensive equipment. In addition, the games limit interactivity among players. The interaction is typically limited to comparison of scores.

On the other hand, typical board and card games are not customized for live broadcasts. They are limited by their original form and therefore are limited in how they relate to a specific broadcast or event.

As such, many interactive games suffer from deficiencies in interactivity among players and with live events. Therefore, an improved live event interactive game would be desirable.

SUMMARY

The disclosure describes a computer-implemented method of providing an event related game. The method includes receiving event data associated with a media broadcast at a computer, generating a printable game set, and providing the printable game set in an electronic format configured for printing by a user. The printable game set includes at least one game card and a set of trade tickets. The at least one game card includes a list of game events associated with the media broadcast. Each trade ticket of the set of trade tickets identifies a game event.

The disclosure also describes a computer-implemented method of providing interactive entertainment associated with a broadcast sports game. The method includes receiving event data associated with the broadcast sports game at a computer, generating a game set, and providing the game set in an electronic format configurable for printing by a user. The game set includes a plurality of game cards and a plurality of trade tickets. Each game card of the plurality of game cards lists a unique set of game events associated with the broadcast sports game. Each trade ticket of the plurality of trade tickets includes a unique game event. At least one of the plurality of trade tickets includes a game win event associated with a team associated with the broadcast sports game.

In addition, the disclosure describes a method of providing interactive entertainment associated with a media event. The method includes accessing a game set provided in a printable electronic format, printing the game set, and distributing one game card of the plurality of game cards and a subset of trade tickets of the set of trade tickets to one of a plurality of players. The game set includes a plurality of game cards and a set of trade tickets. Each game card of the plurality of game cards includes a distinct list of game events. Each trade ticket of the set of trade tickets identifies a game event.

BRIEF DESCRIPTION OF THE DRAWINGS

FIGS. 7, 8 and 9 are pictorials depicting exemplary embodiments of elements of the game, as seen in FIGS. 5 and 6.

DETAILED DESCRIPTION

This disclosure relates to a game and method of delivering the game. The game allows a group of players to interact with a live event such as a football game, sports event, reality television, game show, or day-time drama. However, the game may also be used for, recorded, VCR, DVD, video-on-demand, and pay-per-view events. The game uses a set of cards customized for the event and rules designed to facilitate interaction among a group of players. For example, a game may be associated with a live sports event. Alternately, the game may be associated with a scripted or pre-recorded program.

Figure 1:
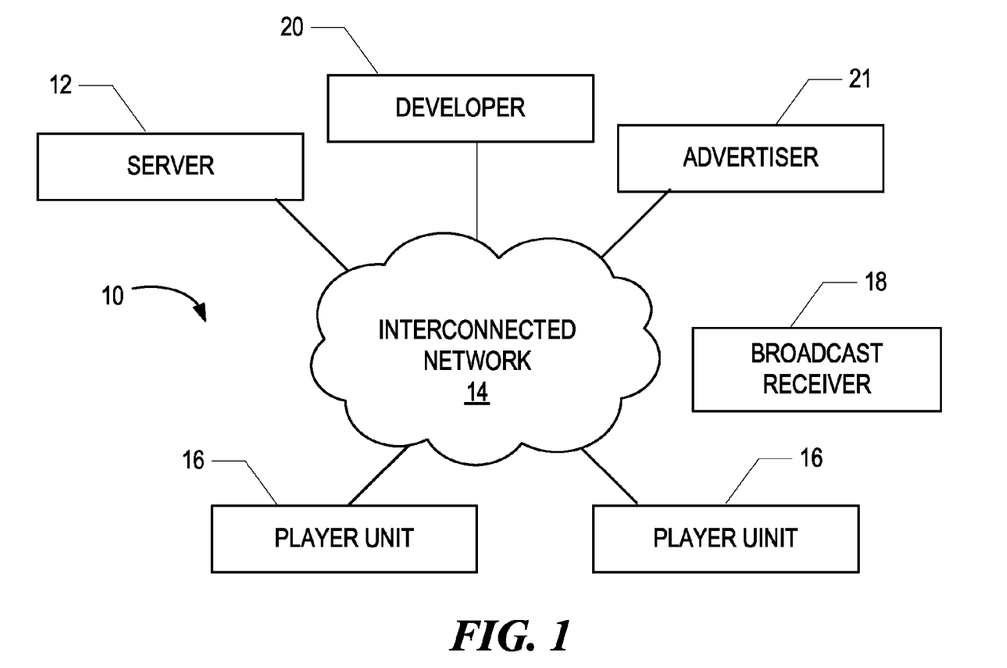
FIG. 1 is a block diagram depicting a system to provide an interactive game.

FIG. 1 is a schematic diagram depicting an exemplary system. The system 10 includes a server 12 connected to a user unit 16 through an interconnected network 14. The system 10 also includes a broadcast receiver 18. A user accesses the server 12 through the user unit 16 to download a game associated with a broadcast event. The user then prints from the user unit 16 game elements that are used to play a game in response to events and happenings during the broadcast event. The user unit 16 may be restricted in the number of times it may print, access, or download the game. The system may also include a developer unit 20 that may access the server 12 through the interconnected network 14. An advertiser 21 may also access the server 12 through the interconnected network 14. However, these elements may or may not be included together, separately or in various combinations.

The interconnected network 14 may, for example, include wireless networks, LAN, VMS, and global networks. The server 12 may, for example, include computational circuits that may communicate using various network protocols across the interconnected network 14. The user unit 16, developer unit 20, and advertisers 21 may, for example, include computational electronics such as handheld computers, notebooks, laptops, desktop computers, portable computers, servers, and other computational circuitry operable for accessing a server 12 over an interconnected network 14.

In one exemplary embodiment, a user may, through the player unit 16 and the interconnected network 14, access the server 12, download the game elements, print them and, with a group of players, watch a broadcast event on the broadcast receiver 18. The broadcast event may, for example, be a football game. The football game has a known set of possible events that may or may not occur during the game. In addition, the rules are established such that one team must win, although which team may not be known at the beginning of the game. The game may comprise a set of game elements including game cards and trade tickets. The game cards and trade tickets may be distributed among a set of players and used in accordance with the game rules upon the observation of events within the game.

For example, a game card may have a quarter-by-quarter listing of a subset of potential events that may or may not occur in the game such as interceptions, fumbles, first downs, touchdowns, field goals, safeties, penalties, punt returns and sacks. If and when any one of these events occurs, the player having a game card listing that event may indicate that the event occurred, such as by crossing, check marking, punching, or filling a box.

In another example, players may be given a set of trade tickets. Each trade ticket is associated with a possible event. A player holding the event card associated with an event that occurs during the game may forcibly trade tickets with another player in an attempt to acquire the winning trade ticket. For example, in a football game, these events may include two point conversions, fumbles, passing touchdowns, rushing touchdowns, video challenges, field goals, interceptions, punts, and time outs. In each case, rewards may be given to players with a winning trade ticket or a winning game card.

In addition, developers through developer unit 20, may access the server to establish game data. The game data may include customizing the game for a given event, adding advertiser information, adding a unique identification number, and managing the distribution. The server 12 may use this data to generate and deliver games to users.

Advertisers 21 may also access the server 12 to place advertisements on the various elements of the game, including advertisements on the game cards and trade tickets. The advertisers 21 may also access the server 12 to acquire purchasing data. Further, advertisers may place coupons on game cards or trade tickets. These placements may also be customized to region based on the locations of the user.

Figure 2:
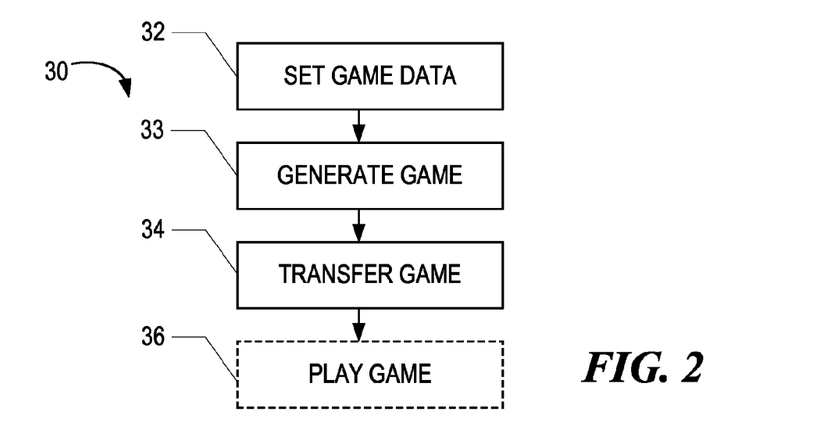
FIGS. 2, 3 and 4 are flow diagrams depicting an exemplary method for delivering and accessing the game.

FIG. 2 is a block flow diagram depicting an exemplary method for delivering a game. The method 30 includes setting or establishing the game data, as shown at step 32, generating the game, as shown at step 33, and transferring the game, as shown at step 34. Setting the game data may include receiving game data from a developer, advertiser or operator of the server. The game data may include specific data associated with the event, rules associated with the event, probabilities associated with game events, advertising data, unique identification numbers, and other data used by the server to create or generate a game. A game set is generated, as shown in step 33.

The server may transfer the game upon request from a user unit and/or when purchased by a user, as shown at step 34. For example, the game set may be transferred in a printable format configured for printing by the user. In one embodiment, the user may access the server and purchase the game by entering information such as addresses and credit card numbers. Alternately, a user may be provided with the game for free for entering information of interest to an advertiser. However, various motivations for transferring a game may be envisaged.

The game may be transferred in formats such as PDF, HTML, XML, and DOC. Alternately, the game may be transferred as a script or instruction file that results in a game file that may be printed. The game may be generated by the server and the files associated with these formats provided. Various file formats may be used that limit the number of printings, accesses, or downloads by the user. Players may play the game, as shown at step 36.

Figure 3:
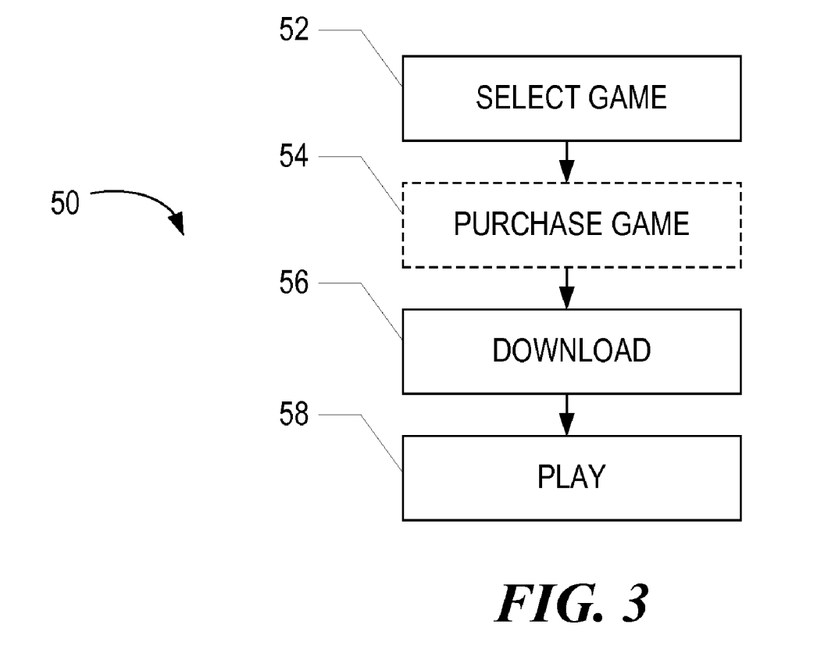

FIG. 3 is another exemplary method for use by the system. The method 50 includes a step of selecting a game, as shown at step 52. A user may identify a desired game. For example, they may choose from a set of football games to be broadcast on a given broadcast day. Alternately, they may select from a variety of sports events or reality TV programs.

Depending upon the arrangement for transfer, the user may purchase the game, as shown at step 54. Purchasing may include entry of credit card numbers, other means of money transfer, or the exchange of information that would have some value to the provider or an advertiser. The user downloads the game, as shown at step 56. The game may be provided in formats, such as PDF and HTML. The system may download the file using transfer formats and protocols including HTTP and FTP.

The user or a select group of players may play the game, as shown at step 58, by watching or listening to a broadcast, or attending a sports event or other event. The game elements may be printed and distributed among the players for use with the broadcast event.

For example, a user may want to play a game associated with a Cowboys/Redskins football game. The user may select the Cowboys/Redskins game, purchase the game and download it. The user may print out the game elements and distribute them among a group of players. Each player may have a game card and a set of trade tickets. The game card may include listings, segregated by quarter, of possible events that may occur within the broadcast of the football game. The players may check off these events if and when they occur. The players may also force other players to trade a ticket with them when an event indicated by a player's trade ticket occurs in the game. Rewards may be distributed for those holding a winning game card and/or trade ticket.

Figure 4:
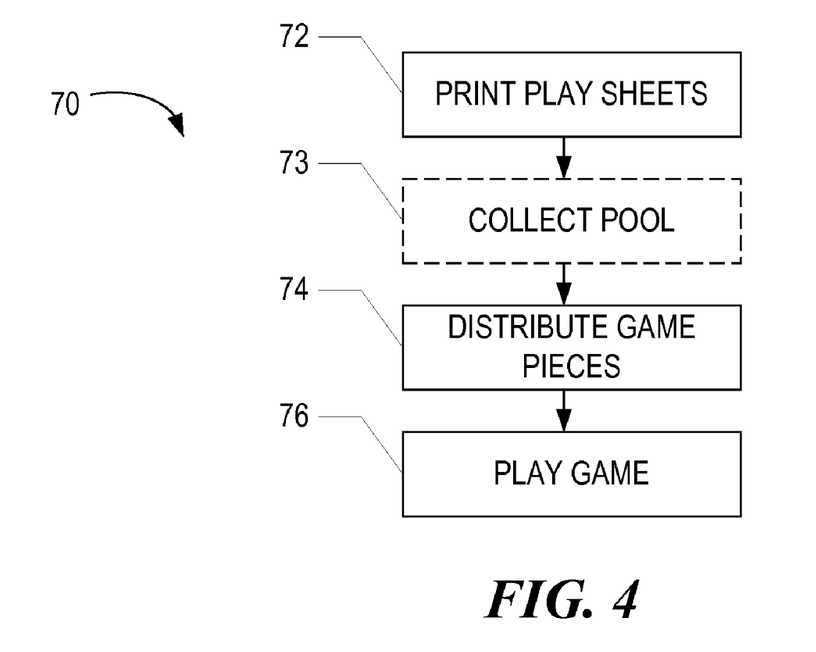

FIG. 4 is a block flow diagram depicting another method for use by the system. Once downloaded, the player may print a play sheet, as shown at step 72. Play sheets may include game elements associated with a specific broadcast event. For example, play sheets may include game cards and trade tickets associated with a specific football game being broadcast. The user may collect a pool of money from players, as shown at step 73. The game pieces are distributed to players, as shown at step 74. The pool may act as the source of rewards for those who win the game. Players may play the game, as shown in step 76, by observing the broadcast and responding to events within the broadcast in accordance with game rules.

Figure 5:
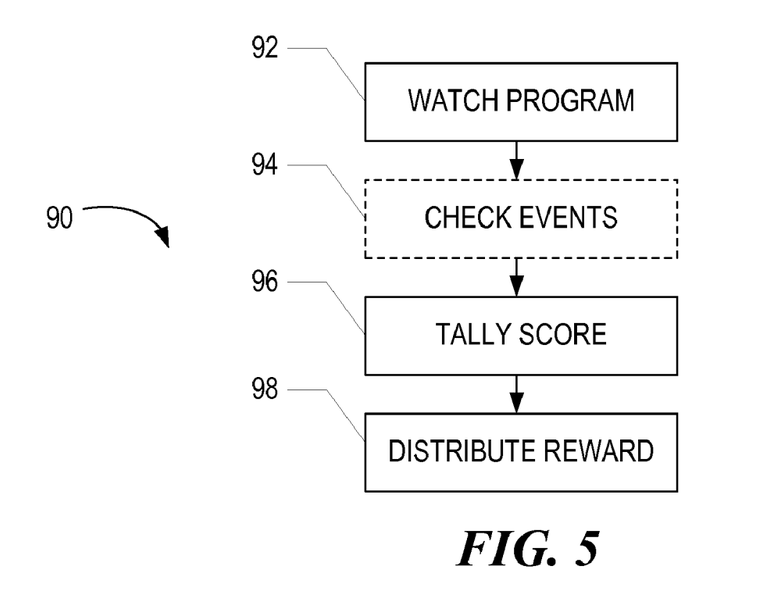
FIGS. 5 and 6 are flow diagram depicting an exemplary method of playing a game.
Figure 8:
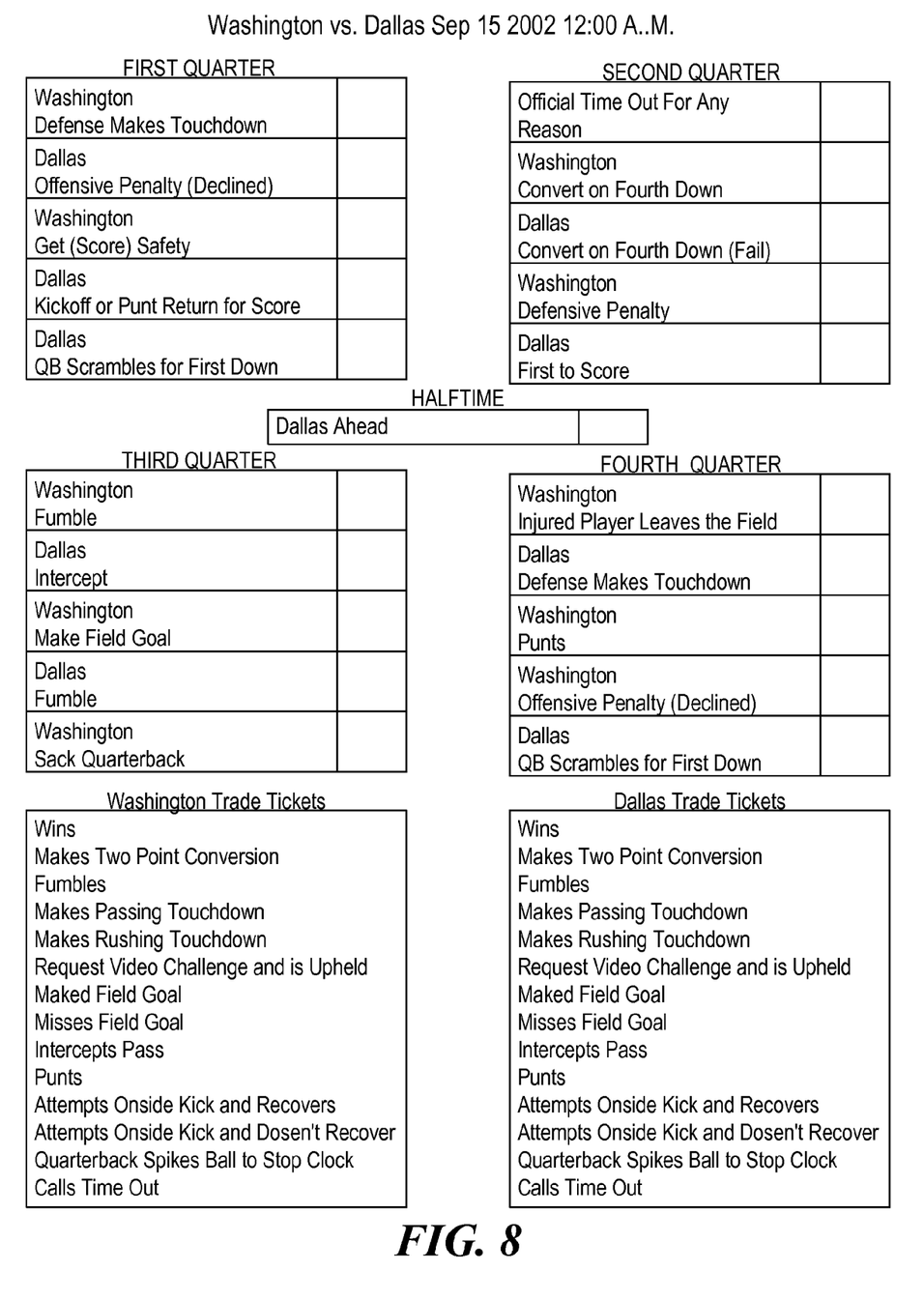

FIGS. 5, 6, 7, 8 and 9 depict an exemplary game or games for use with this delivery method. FIG. 5 depicts a method 90 in which players watch a broadcast of a sports event, as shown at step 92. As events occur within the game or sports event that are indicated on a game card, players check off these events, as shown at step 94. At the end of the period or end of the game, scores may be tallied, as shown at step 96. Rewards may be distributed, as shown at step 98, in accordance with the rules for winning These rules may include receiving a portion of the pool for each event checked on the game card, giving a portion of the pool to the card with the highest score, or various combinations. For example, a group of players may all put money into a pool and distribute a part of the pool to the player with the highest scoring game card. In another exemplary embodiment, the players may distribute the money in proportion to the number of events checked on a game card or the score of the game card. Alternately, establishments may provide various rewards and incentives such as gift cards, drinks, T-shirts, novelty items and other items, in accordance with various methods of scoring game cards. The game cards may also include trivia questions and players may be graded on the answers. The answers may be broadcast as part of the event. One example of a game card is shown in FIG. 8.

Figure 6:
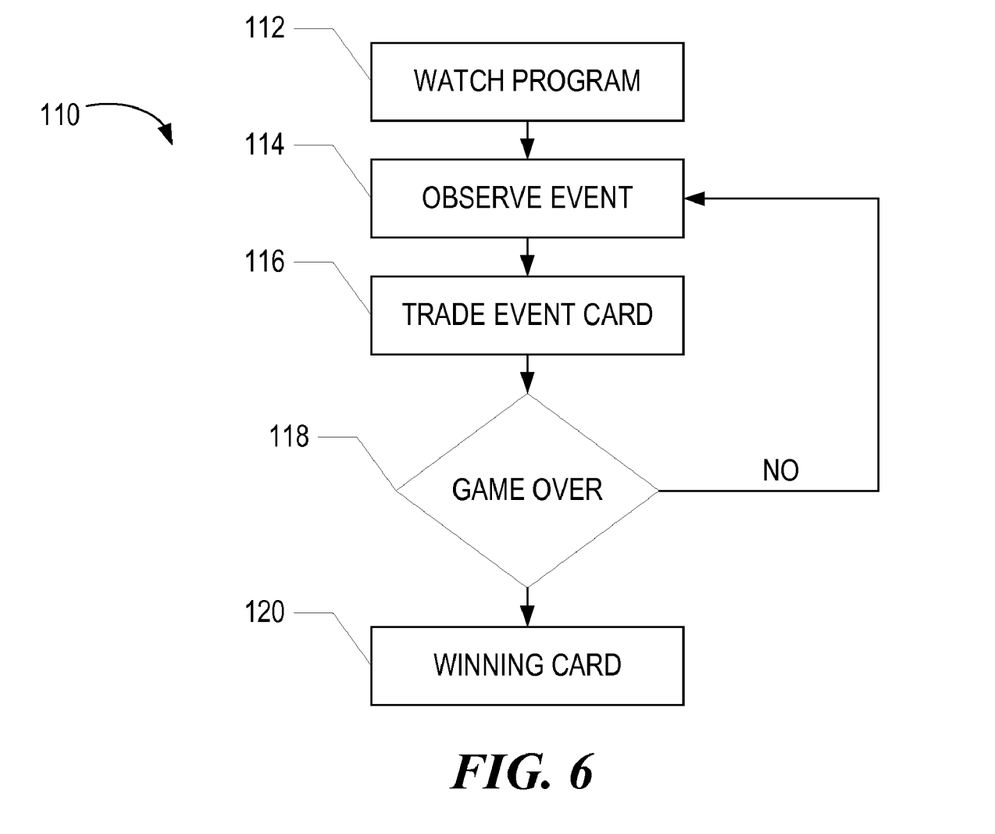
Figure 9:
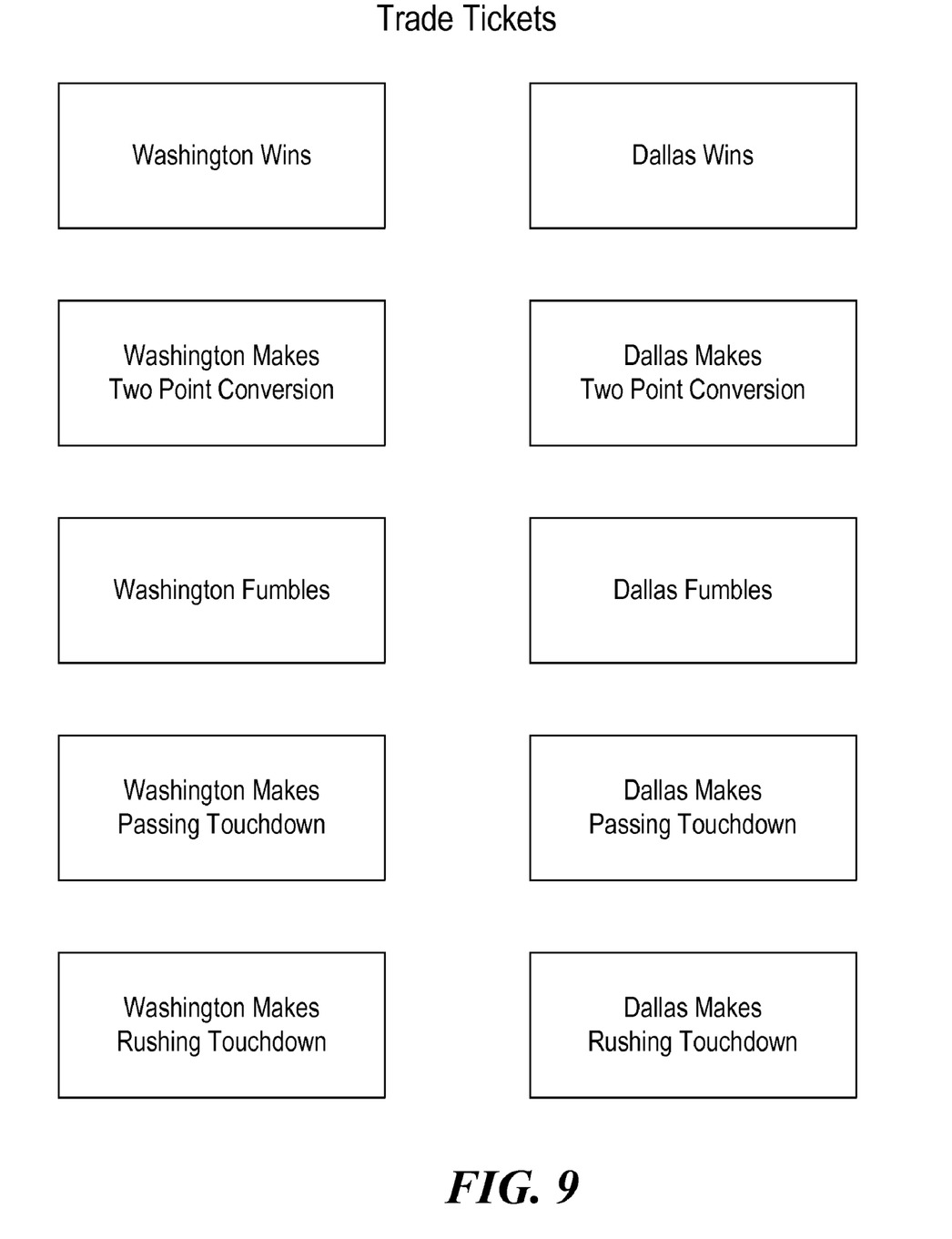

FIG. 6 is another exemplary method for playing a game. The method 110 begins with players watching the program, as shown at step 112, such as a sports event or reality television. The players have a set of trade tickets. Each trade ticket has at least one event listed from a set of possible events that may occur within the sports event or broadcast. If an event is observed, as shown at step 114, a player holding a trade ticket indicating that event may force another player to trade tickets, as shown at step 116. The trade tickets may additionally include a final event or outcome such as team 1 wins or team 2 wins. If the game is not over, as shown at step 118, players continue to observe events and forcibly trade tickets as those events occur. Once the game ends, the reward is distributed, as shown in step 120, for that player holding the winning card. An example of a sheet of trade tickets is shown in FIG. 9.

In one exemplary embodiment, the game may be associated with a football game between the Dallas Cowboys and the Washington Redskins A set of trade tickets may be distributed among players that include events such as one team fumbles or a pass is intercepted. The trade tickets may also include trade tickets such as Dallas fumbles or Washington intercepts a pass. The trade tickets also include two final cards indicating the outcome of the event, such as Dallas wins or Washington wins. Players may trade tickets as events occur in an attempt to be in possession of the winning trade ticket at the end of the game. For example, if, near the end of the game, it appears that Dallas will win the game, and an event such as Dallas intercepts the ball occurs, the player holding the Dallas intercepts pass trade ticket may trade another player having the Dallas wins ticket to acquire the Dallas wins ticket. If the game ends and Dallas wins, then the player holding the Dallas wins ticket may be rewarded.

The game cards and trade tickets may be generated by the server in accordance with data associated with the event. For example, the server may customize a generic football data set for use with a specific football game, such as the Dallas Cowboys versus the Washington Redskins. A server may then generate the game cards and/or trade tickets in accordance with this data. In addition, the server may generate these cards and tickets in accordance with other probability data associated with the occurrence of these events. FIG. 7 depicts an exemplary table of possible events and their likelihood of occurring within any given quarter. The server may use this table or a similar data set depending upon the game, such as a football game between Dallas and Washington as shown in FIGS. 8 and 9, or the illustrative example of New York versus Baltimore shown in FIG. 7, to generate lists and subsets of possible events for placements within each game card and on trade tickets. The server may additionally use these probabilities to ensure that any one game card has an approximately equal chance of winning The game data may be further customized based on the skills or past performance of the team, the level of competition, such as college or professional, and other influencing factors.

A game card as exemplified in FIG. 8 may take various forms. A different game may, for example, be distributed to each player. In this exemplary embodiment, the game card may include subsets of events selected from the list of possible occurrences and distributed among quarters. In this exemplary embodiment, Quarter 1, for example, includes events such as Washington defense makes touchdown, Dallas offensive penalty declined, Washington gets score safety, Dallas kick-off or punt return for score, and Dallas quarterback scrambles for first down. However, each quarter and each card will have a differing set of events. The cards may also include a half-time event such as Dallas ahead.

The card may further include an indication, here shown at the top, indicating to which game the card applies. Further, the card may include various advertisements by various advertisers. The advertisement may be generated with the card or pre-set as part of a template. The card may include a coupon and/or trivia questions.

Furthermore, the card may include a list of all the possible trade tickets such that when events occurring with a trade ticket all players know that the trade ticket exists and the player having the trade ticket knows what other trade tickets are available for trading.

Game cards may also have a unique number. The unique number may be used to participate in a raffle, sweepstakes, or lottery. This unique number may be assigned or generated by the server.

FIG. 9 is an exemplary embodiment of a sheet of trade tickets. FIG. 9 shows 10 trade tickets. However, a game may include more or less than 10 trade tickets. The number of trade tickets may be varied depending on the number of players, type of event, and style of game. The trade tickets may include various events that may or may not occur during the game, such as Washington makes 2-point conversion and Washington fumbles. In addition, the sheet of trade tickets should include trade tickets indicative of potential outcomes of the event such as Washington wins or Dallas wins. Players may trade tickets in response to events indicated on the trade tickets for trade tickets using various strategies to acquire the winning trade ticket, be it Washington wins or Dallas wins. In an alternate embodiment, the winning or outcome trade tickets may include a unique number. The unique number may be used to participate in a raffle, sweepstakes, or lottery. Further, the trade tickets may include coupons and advertisements. For example, an advertiser may place a coupon for drinks or pizza among the trade tickets.

Figure 10:
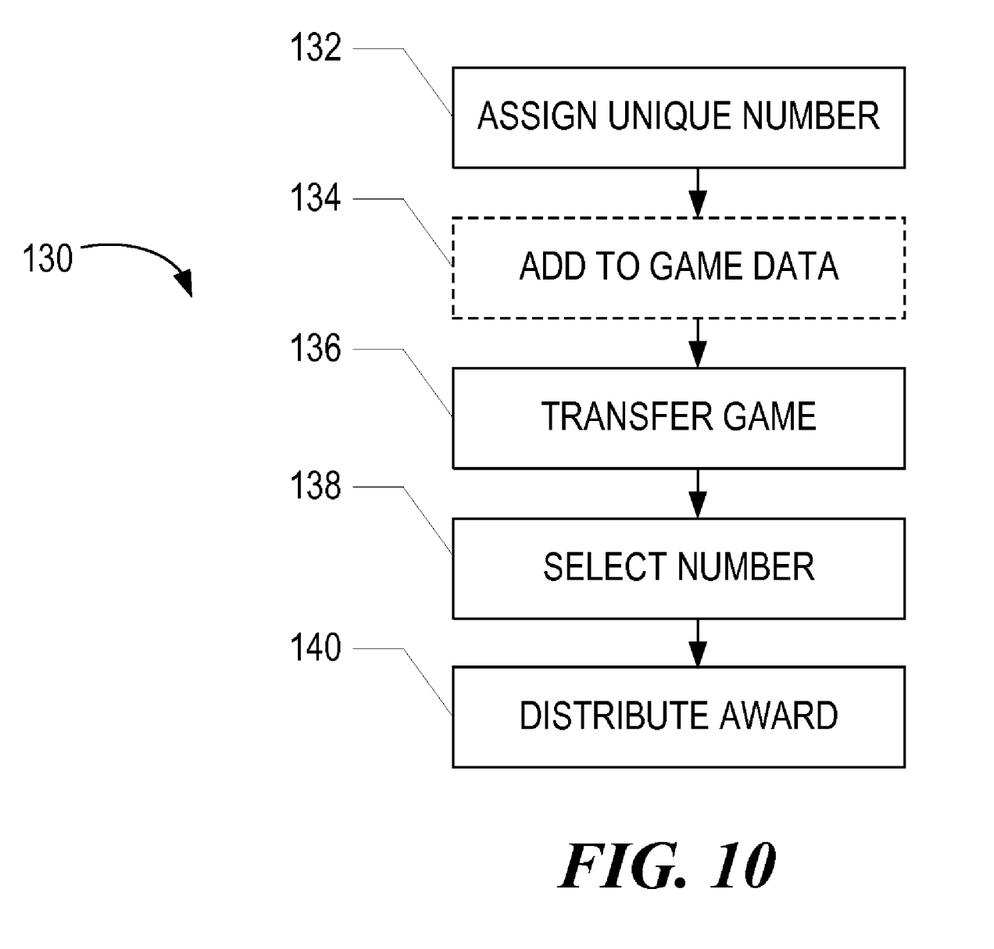
FIG. 10 is a flow diagram depicting an exemplary method for use with the game.

FIG. 10 depicts another exemplary method for use with the system. In this method 130, the server may assign a unique number, as shown at step 132, to each game set purchased. The unique number may be added to the game data, as shown at step 134. This may include adding the unique number to the trade tickets or the game cards. The unique number identifies the game set and may be used for tracking purposes, lotteries, sweepstakes, or raffles.

The game set is transferred, as shown in step 136. At a prescribed point in time, one unique number is selected from the set of distributed unique number as seen in a block 138. This may, for example, be performed in a lottery or sweepstakes fashion. An award is distributed, as shown in step 140. For example, the sponsor of or advertiser with the game may establish a sweepstakes in which one winner among purchasers of the game set is awarded with a portion of a larger pool derived from game purchases.

Aspects of the system for delivering an interactive game include a server accessible by a user through an interconnected network and a broadcast receiver. The user may access the server to download a game set associated with a broadcast event in various document formats. The user may print the game and distribute its elements among a group of players. The game may be associated with various broadcast events, including football games, sports events, reality television, pay-per-view events, and video-on-demand programming. The game may be downloaded in various formats including PDF formats, HTML formats, XML formats, word processor document formats, program instruction formats such as JAVA and Javascript. For example, the game may be downloaded in a PDF format and limited to a set number of printing attempts. The user's unit may take various forms such as a laptop, handheld circuitry, or desktop computer. The game may be played in residential setting or public settings such as bars, restaurants and clubs.

Additional aspects may be found in a method for delivering a game. The method may include setting a game data, transferring the game, and playing the game. The game data may include specific data about a broadcast event, advertisers and advertisements associated with the game, unique allocation numbers associated with additional aspects of the game, and information specific to the user. The game may be transferred through an interconnected network to a user unit. The user may print the game from the user unit and distribute it among the players.

Aspects of the game may include a set of game cards and a set of trade tickets associated with events that possible could occur within a broadcast event. Each game card has a list or subset of the possible events that could occur in the broadcast event. The game card may also include a list of available trade tickets, a unique identification number, advertisements, trivia questions, coupons, and/or information specific to the broadcast event. The game card may have a list of events subdivided by periods in which they occurred or may occur. The trade tickets may include one event selected from a set of possible events that may occur within the broadcast event. The trade tickets are exchanged when an event occurs that is listed on the trade ticket. At the end of the broadcast event, rewards may be distributed for persons holding the trade ticket associated with the final event or winner. The trade tickets may also have a unique identification number, trivia questions, and coupons. Rewards may also be distributed for players having events listed on their game card that occurred during the broadcast event. The winning trade ticket may also include a unique identification number for use with a raffle, sweepstakes, or lottery. The game cards and/or trade tickets may be delivered in a format such as PDF with limits on a number of printings. The game may be copied onto cards with one of several colors such that the same game may be played among many groups in a public setting, each group having a game with a different color.

Aspects may be found in a method for playing the game. The method may include watching a broadcast program, observing an event, and trading an event ticket. A player holding an event ticket associated with the observed event may trade that ticket for another event ticket. When the game ends, the person holding a ticket indicating a win receives a reward.

Another aspect is found in a further method for playing a game. The method includes watching a broadcast event, observing events, and indicating the occurrence of those events on a game card listing a subset of possible events. The method may further include tallying scores associated with the number of events occurring in a game that appear on a card. The method may further include distributing the reward based on tallying the scores.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of providing interactive entertainment associated with a media event, the method comprising:
    accessing a game set in a printable electronic format, the game set including a plurality of electronic game cards and a set of electronic trade tickets, each electronic game card of the plurality of game cards including a distinct list of game events, each electronic trade ticket of the set of electronic trade tickets identifying a game event;
    printing the game set including printing the plurality of electronic game cards and the set of electronic trade tickets in a printed format; and
    distributing, after printing the game set, one printed game card of the plurality of printed game cards and a subset of printed trade tickets of the set of printed trade tickets to each of a plurality of players, wherein a first player of the plurality of players exchanges a first printed trade ticket with a second player of the plurality of players for a second printed trade ticket in response to the occurrence of a game event listed on the first printed trade ticket, the first printed trade ticket being distributed to the first player and the second printed trade ticket being distributed to the second player.

2. The method of claim 1, wherein a player of the plurality of players marks a game card in response to the occurrence of game events included in the distinct list of game events.

3. The method of claim 1, further comprising scoring each game card of the plurality of game cards upon completion of the media event.

4. The method of claim 3, further comprising distributing a prize to a player in response to scoring each game card.

5. The method of claim 1, further comprising distributing a prize to a player holding a trade ticket indicating a game winning event upon completion of the media event.

6. The method of claim 1, further comprising displaying the media event.

* * * * *